United States Patent
Yokomae et al.

(10) Patent No.: US 9,811,075 B2
(45) Date of Patent: Nov. 7, 2017

(54) PRODUCTION SYSTEM

(71) Applicant: Panasonic Corporation, Osaka (JP)

(72) Inventors: Takahiro Yokomae, Yamanashi (JP); Nobuya Matsuo, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 499 days.

(21) Appl. No.: 14/316,187

(22) Filed: Jun. 26, 2014

(65) Prior Publication Data
US 2015/0045916 A1    Feb. 12, 2015

(30) Foreign Application Priority Data
Aug. 7, 2013 (JP) ................................. 2013-163887

(51) Int. Cl.
G05B 15/02 (2006.01)
G05B 19/409 (2006.01)

(52) U.S. Cl.
CPC .. G05B 19/409 (2013.01); *G05B 2219/36159* (2013.01)

(58) Field of Classification Search
CPC .................... G05B 19/409; G05B 2219/36159
USPC .......................................................... 700/83
See application file for complete search history.

(56) References Cited

U.S. PATENT DOCUMENTS 4,755,691 A * 7/1988 Bethea ............... H05B 37/0209
307/114
7,212,108 B2   5/2007 Nakazawa et al.
2003/0083009 A1 * 5/2003 Freyman ................. H04L 63/10
455/26.1
2005/0114085 A1   5/2005 Nakazawa et al.
2009/0150794 A1 * 6/2009 Sano ....................... G08C 17/00
715/740
2009/0177791 A1 * 7/2009 Edelstein .............. H04L 67/025
709/229

(Continued)

FOREIGN PATENT DOCUMENTS

JP     2000-315103 A    11/2000
JP     2003-243897 A     8/2003

(Continued)

OTHER PUBLICATIONS

Yokoi Takaaki, JP2003243897 Translation, Aug. 2003, Espacenet.*
Japanese Office Action for Application No. JP-2013-163887 dated Nov. 18, 2015.

*Primary Examiner* — Kenneth M Lo
*Assistant Examiner* — Alan Chu
(74) *Attorney, Agent, or Firm* — Pearne & Gordon LLP (57) ABSTRACT

A production system includes a production facility and a portable operation terminal connectable to the production facility through a wireless communication. A connection state is brought between the production facility and the portable operation terminal by sending a connection request signal for a connection request to the production facility from the portable operation terminal, and sending a connection permission signal for responding to the connection request signal to the portable operation terminal from the production facility according to a predetermined condition, and it is permitted that the operation input to a control processing portion of the production facility from the portable operation terminal in the connection state.

10 Claims, 10 Drawing Sheets

(56) References Cited

U.S. PATENT DOCUMENTS

2011/0184548 A1* 7/2011 Higashi ............ H05K 13/0452
                                                          700/121

FOREIGN PATENT DOCUMENTS

| | | | | |
|---|---|---|---|---|
| JP | 2003243897 | * | 8/2003 | ............ H05K 13/04 |
| JP | 2004-133509 A | | 4/2004 | |
| JP | 2004-234229 A | | 8/2004 | |
| JP | 2005-115716 A | | 4/2005 | |
| JP | 2007-156645 A | | 6/2007 | |
| JP | 2008-234318 A | | 10/2008 | |
| JP | 2009-265719 A | | 11/2009 | |
| JP | 2010-192772 A | | 9/2010 | |
| JP | 2012-256134 A | | 12/2012 | |
| JP | 2013-030641 A | | 2/2013 | |

* cited by examiner

PRODUCTION SYSTEM

CROSS REFERENCE TO RELATED APPLICATIONS

The present application is based on and claims the benefit of the Japanese patent application No. 2013-163887 filed on Aug. 7, 2013, the contents of which are incorporated herein by reference in its entirety.

BACKGROUND OF THE INVENTION

1. Field of the Invention

The present invention relates to a production system configured to include a production facility used to produce a product and a portable operation terminal connectable thereto through a wireless communication.

2. Description of the Related Art

For a production system configured by a production facility used to produce a product, a component mounting system is known which includes a component mounting facility that works for mounting an electronic component on a board. Hereinafter, the background art will be described by exemplifying the component mounting system.

A component mounting facility executing various component mounting work such as mounting components is used in the component mounting system which mounts electronic components on a board such as a circuit board or a liquid crystal board. The component mounting facility includes a control portion which controls a working portion executing component mounting work and an operation portion which performs a necessary operation input on the control portion, and the operation portion is formed by a display panel displaying an operation screen, operation switches, and the like. In the component mounting system with this configuration, instead of a method in which a worker accesses the operation portion and directly performs an operation input thereon, a method is used in which an operation input is performed by using a portable operation terminal such as a tablet PC which can perform a wireless communication (for example, refer to JP-A-2013-30641). In the related art disclosed in the example of JP-A-2013-30641, a display/input screen of a plurality of devices which are targets of operation is displayed on the tablet PC. Accordingly, there is an advantage in that a display function and an input function of the plurality of devices can be executed by using the tablet PC, and thus operability is improved.

SUMMARY OF THE INVENTION

However, there is the following problem in relation to safety in the related art including the example of JP-A-2013-30641. In other words, a portable operation terminal such as the tablet PC is connected to an operation target through wireless communication, and thus a worker can operate a device at any position. For this reason, there is a concern that the portable terminal may be connected to an inappropriate device, and thus this may lead to a wrong connection. As mentioned above, there is a problem in that countermeasures for an unsafe operation or a wrong connection are insufficient in the method in which a component mounting facility is operated by the portable operation terminal through wireless communication in the related art. In addition, this problem is not limited to the component mounting facility and also occurs in production facilities of other technical fields.

Therefore, an object of the present invention is to provide a production system when a production facility of which a representative is a component mounting facility is operated by a portable operation terminal through a wireless communication.

A production system according to an aspect of the present invention includes: a production facility that is used to produce a product; and a portable operation terminal connectable to the production facility through a wireless communication. The production facility includes: a working portion that executes work for production; a control processing portion that controls and causes the working portion to execute the work; a facility-side operation input unit for performing an operation input on the control processing portion; and a facility-side connection processing portion that brings a connection state between the production facility and the portable operation terminal to be in a connection state. The portable operation terminal includes: a terminal-side operation input unit in which a display portion and an operation portion are united as one unit; a facility-operation processing portion that displays a facility-operation screen used to operate the production facility on the display portion, and causes the terminal-side operation input unit to function as a unit for performing an operation input on the production facility; and a terminal-side connection processing portion that brings the connection state between the facility-operation processing portion and the production facility which is a target for the operation input. The connection state is brought by sending a connection request signal for a connection request to the facility-side connection processing portion from the terminal-side connection processing portion, and sending a connection permission signal for responding to the connection request signal to the terminal-side connection processing portion from the facility-side connection processing portion according to a predetermined condition, and it is permitted that the operation input to the control processing portion of the production facility from the portable operation terminal in the connection state.

According to the aspect of the present invention, the production system, configured to include the production facility and the portable operation terminal connectable thereto through a wireless communication, is provided with the facility-side connection processing portion which brings a connection state between the facility-side operation input unit and the portable operation terminal, and the terminal-side connection processing portion which brings the connection state between the facility-operation processing portion and a production facility serving as an operation input target. The terminal-side connection processing portion sends a connection request signal for a connection request to the facility-side connection processing portion, and the facility-side connection processing portion sends a connection permission signal for responding to the connection request signal to the terminal-side connection processing portion according to a predetermined condition, so that the connection state is brought. In this connection state, it is permitted that the operation input to the control processing portion of the production facility from the portable operation terminal. Accordingly, the portable operation terminal is connected to only the production facility which outputs the connection permission signal for responding to the connection request signal according to a predetermined condition, and thus it is possible to prevent the portable operation terminal from being wrongly connected to other production facilities.

DETAILED DESCRIPTION OF THE EXEMPLARY EMBODIMENTS

Figure 1:
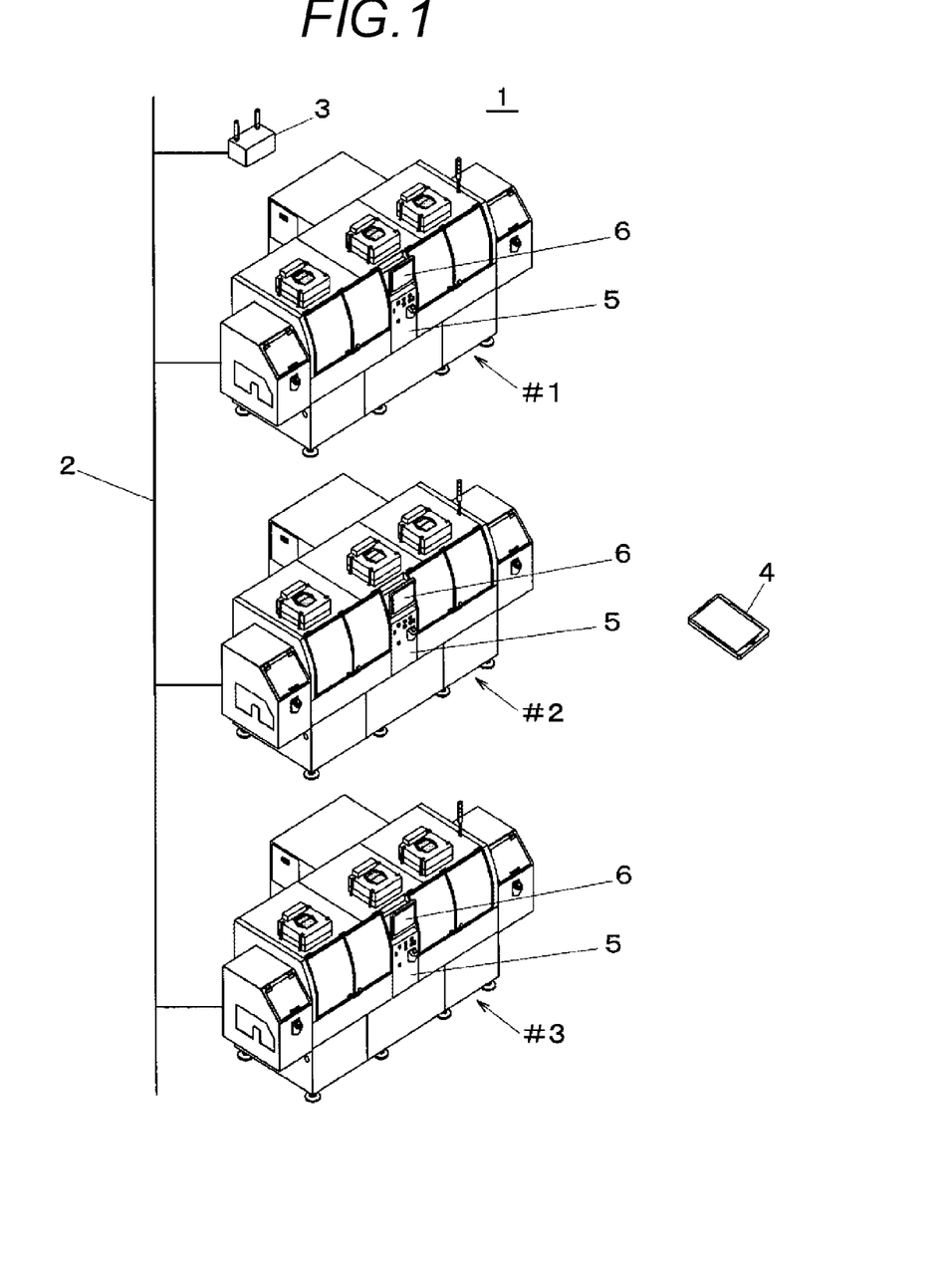
FIG. 1 illustrates a configuration of a production system according to an embodiment of the present invention.

Next, an embodiment of the present invention will be described with reference to the drawings. First, with reference to FIG. 1, a description will be made of a configuration of a component mounting system 1. In FIG. 1, the component mounting system 1 is an example of a production system having a function of producing a liquid crystal panel as a product, and mainly includes a component mounting line in which component mounting devices #1, #2, #3, . . . (hereinafter, abbreviated to facilities #1, #2, #3, . . . ) which are production facilities used to produce products are connected to each other via a communication network 2. The communication network 2 is provided with a wireless station 3. The production facilities can be connected to a tablet PC 4 which is a portable operation terminal through a wireless communication.

Each of the facilities #1, #2, #3, . . . includes an operation input portion 11 (refer to FIG. 2) such as an operation panel 5 provided with operation switches and a display panel 6 provided with touch panel switches. In a case where a worker who is in charge of production management and maintenance of the component mounting system 1 performs various operations on each device, not only a direct operation can be performed by using such operation and input units, but also a remote operation can be performed by using the tablet PC 4 which is carried by the worker.

Figure 2:
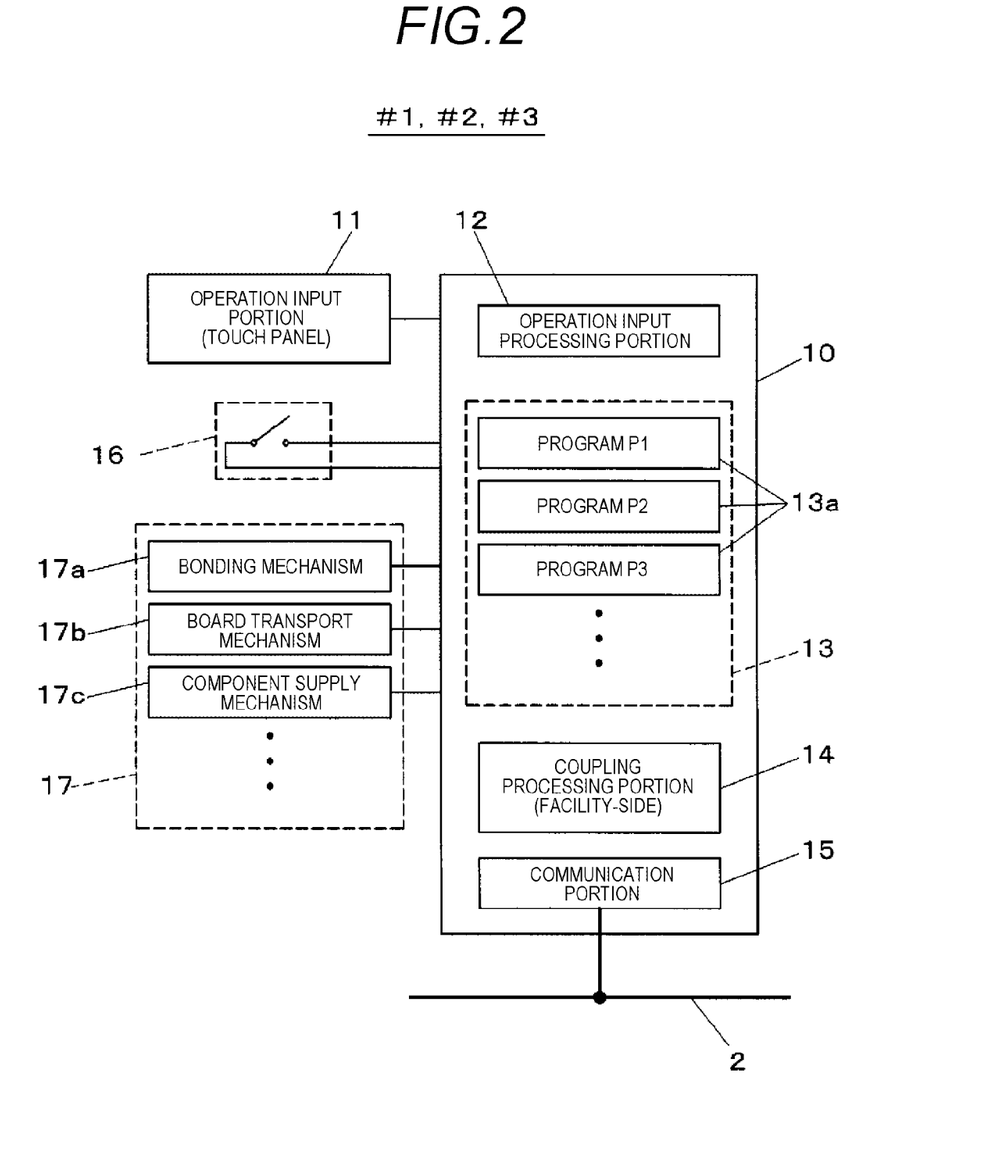
FIG. 2 is a block diagram illustrating a configuration of a production facility of the production system according to the embodiment of the present invention.

Next, with reference to FIG. 2, a description will be made of a configuration of each of the facilities #1, #2 and #3. In FIG. 2, the facilities #1, #2 and #3 have a configuration in which a working portion 17 including a bonding mechanism 17a, a board transport mechanism 17b, a component supply mechanism 17c, and the like which execute various work for mounting electronic components on a liquid crystal board is controlled by the operation input portion 11 such as the display panel 6 and by a control unit 10 connected to a hardware switch 16.

The control unit 10 includes an operation input processing portion 12, a control processing portion 13 which has a plurality of built-in programs 13a, a coupling processing portion (facility-side) 14, and a communication portion 15. The control processing portion 13 controls the working portion 17 according to the programs 13a to execute bonding work for bonding an electronic component to a liquid crystal board, board transport work for transporting the liquid crystal board, component supply work for supplying an electronic component, and the like.

When a worker operates the operation input portion 11, a control operation signal is input to the control unit 10, and the input control operation signal is sent to the control processing portion 13 as a predetermined control command by the operation input processing portion 12. In other words, the operation input portion 11 and the operation input processing portion 12 serve as a facility-side operation input unit for performing an operation input on the control processing portion 13.

Figure 4:
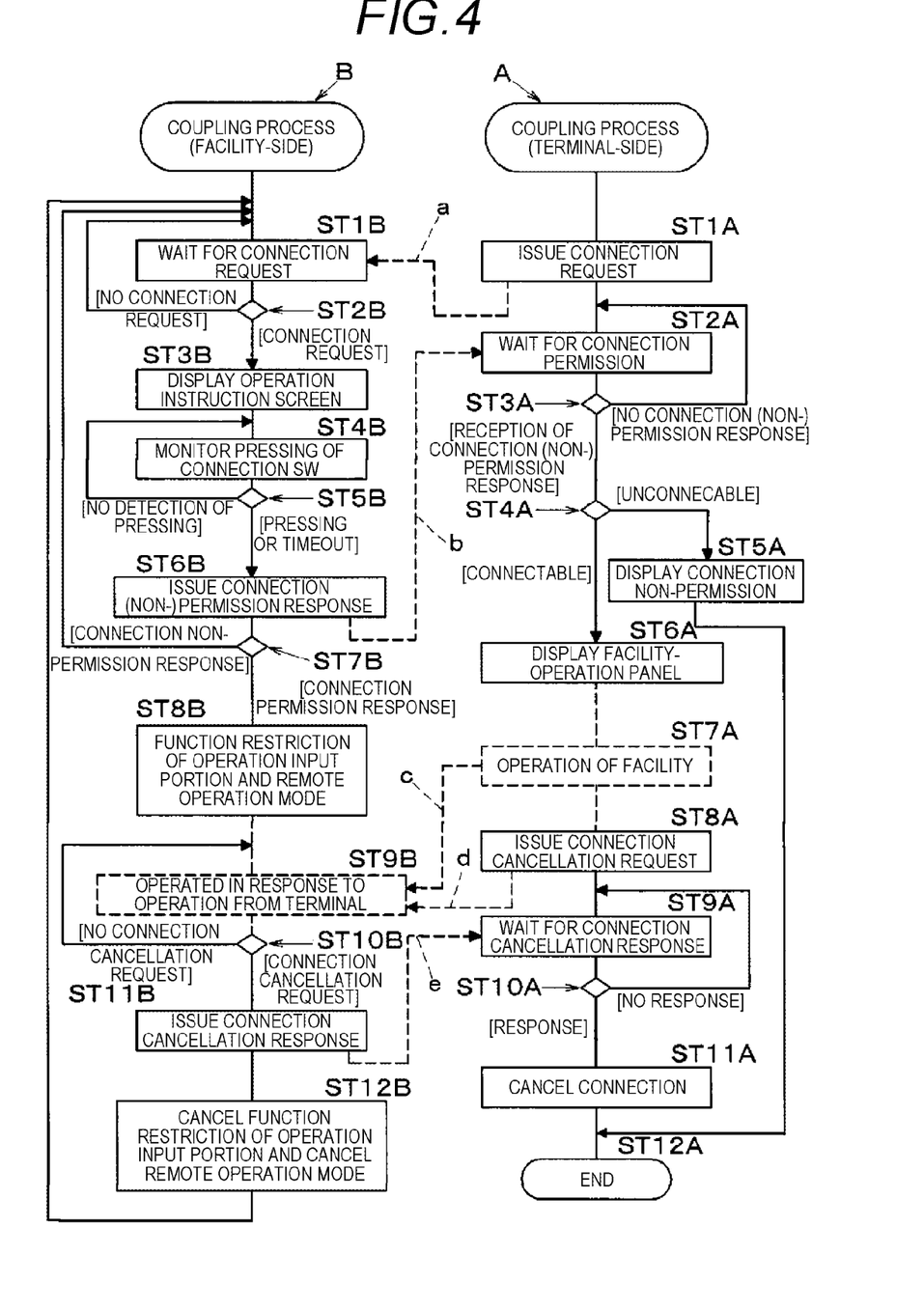
FIG. 4 is a flowchart illustrating a coupling process between the production facility and the portable operation terminal in the production system according to the embodiment of the present invention.

The coupling processing portion (facility-side) 14 is a facility-side connection processing portion, and performs a coupling process (facility-side) of connecting the above-described facility-side operation input unit to the tablet PC 4 (refer to FIG. 4). The communication portion 15 is a communication interface, that transmits and receives wired signals to and from other facilities via the communication network 2, and transmits and receives wireless signals to and from the tablet PC 4 via the wireless station 3 connected to the communication network 2. The hardware switch 16 is one of operation switches disposed at the operation panel 5, and functions as an input portion which allows a worker to input a signal which should be input according to determination of the worker under predetermined circumstances, such as a connection permission input indicating that a request for connection to the tablet PC 4 is permitted. That is, in the present embodiment, the worker performing the connection permission input by using the hardware switch 16 as an input portion is a predetermined condition for permitting a connection request.

In addition, here, although an example is described in which the operation switch provided at the operation panel 5 is used as the hardware switch 16 which is an input portion, a location where the hardware switch 16 as an input portion is provided is not limited to the operation panel 5, and a hardware switch may be provided at a location which is accessed by the worker for certain work in the production facility, for example, may be provided at a plurality of locations including a facility rear surface for replenishing a component. Accordingly, at the time of a process of connection to the tablet PC 4 which is necessary in order to access the production facility for performing work, the worker can perform a connection permission input by using the hardware switch 16 provided at a part where work is performed, and thus workability is considerably improved.

Figure 3:
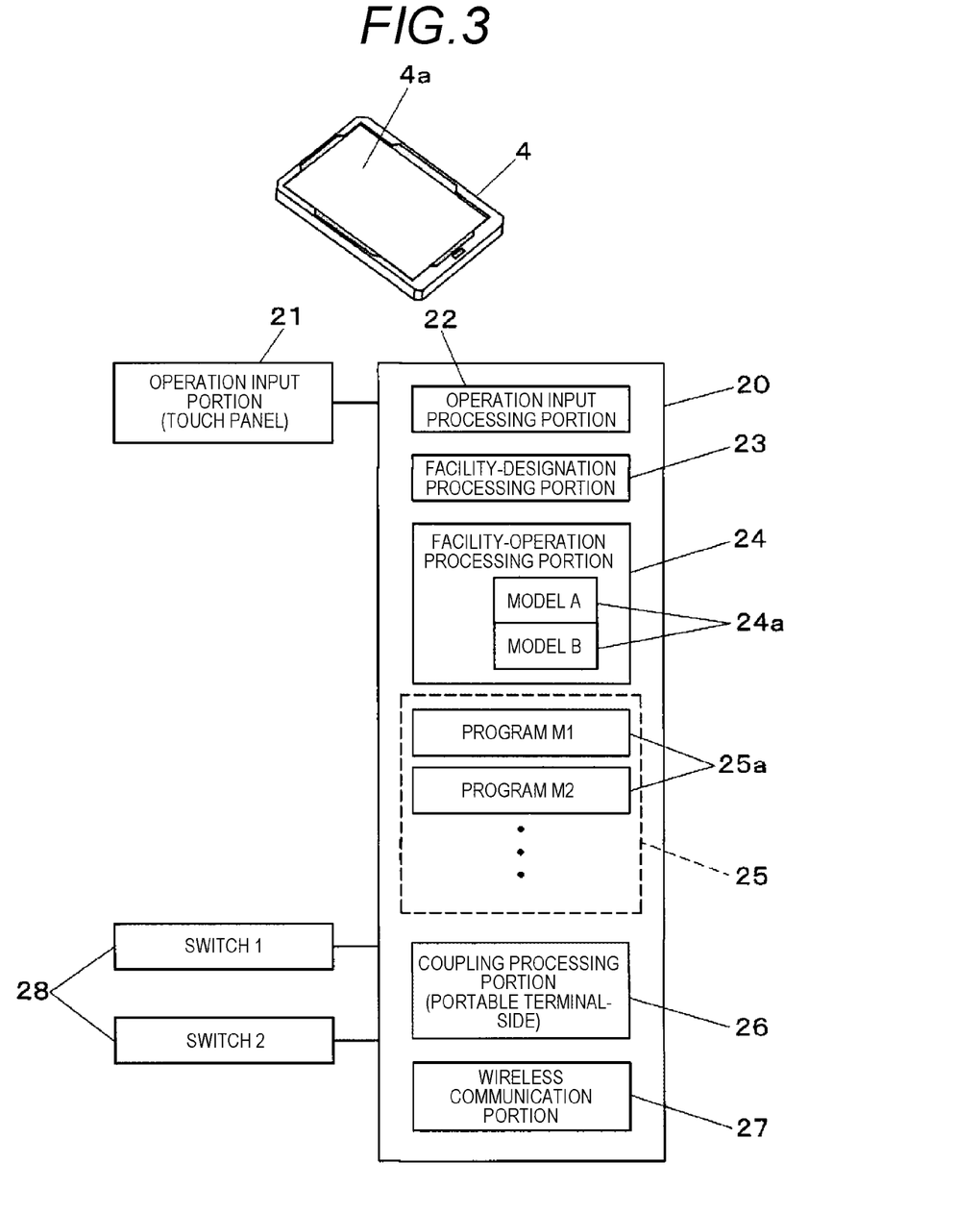
FIG. 3 is a block diagram illustrating a configuration of a portable operation terminal of the production system according to the embodiment of the present invention.

Next, with reference to FIG. 3, a configuration of the tablet PC 4 will be described. In FIG. 3, the tablet PC 4 is a tablet terminal in which a touch panel type operation input portion 21 which is an operation portion is provided on a display/operation screen 4a which is a display portion. A main body portion of the tablet PC 4 is provided with external operation switches 28, and the main body portion has a built-in processing unit 20 including an operation input processing portion 22, a facility-designation processing portion 23, a facility-operation processing portion 24, a control processing portion 25, a coupling processing portion (portable terminal-side) 26, and a wireless communication portion 27.

In a case where the tablet PC 4 functions as a normal tablet terminal, when the worker performs a touch operation on the display/operation screen 4a, an operation signal is input to the operation input processing portion 22 by a function of the operation input portion 21, and the input operation signal is sent to the control processing portion 25 as a predetermined operation command by the operation input processing portion 22.

In a case where the tablet PC 4 functions as an operation terminal of a facility which is in a state of being connected to the tablet PC 4 through a coupling process, when the worker performs a touch operation on the display/operation screen 4a, an operation signal is input to the facility-operation processing portion 24 by a function of the operation input portion 21 so that the facility-operation processing portion 24 generates a control command for a corresponding facility on the basis of the operation signal, and the wireless communication portion 27 outputs the generated control command. The control command output from the wireless communication portion 27 is sent to the control processing portion 13 of the corresponding facility via the wireless station 3 and the communication network 2.

In other words, the operation input portion 21 and the operation input processing portion 22 are a terminal-side operation input unit in which the display portion and the operation portion are united as one unit, and the terminal-side operation input unit performs an operation input on the facility-designation processing portion 23 and the facility-operation processing portion 24. Although an example of using the tablet PC 4 as a portable operation terminal is described here, a terminal apparatus such as a laptop computer may be used in which a display panel as a display portion and a keyboard or a mouse as an operation portion are united as one unit.

The facility-operation processing portion 24 displays a facility-operation screen which is used to operate the facilities #1, #2, #3, . . . which are production facilities on the display/operation screen 4a which is a display portion, and also performs a facility-operation process of allowing the above-described terminal-side operation input unit to function as a unit for performing an operation input on a corresponding production facility. The facility-operation processing portion 24 stores model data 24a regarding operation screen information or a control command for each model in order to designate a plurality of different models as operation targets. The facility-operation processing portion 24 is set to generate only some necessary control commands among control commands used in the facilities #1, #2, #3, . . . . Accordingly, operation items which can be operated from the tablet PC 4 are limited to some operation items which are necessary among operation items which can be operated by the facility-side operation input unit.

The facility-designation processing portion 23 performs a process in which a production facility selected from among the plurality of facilities #1, #2, #3, . . . is connected to the tablet PC 4 so as to be designated as a production facility which is a target of an remote operation input. In other words, any one of the facilities #1, #2, #3, . . . is designated as a connection target from a facility-designation screen (refer to FIG. 5) displayed on the display/operation screen 4a. In addition, the facility-operation processing portion 24 displays a facility-operation screen for executing production work in a production facility designated by the facility-designation processing portion 23, on the tablet PC 4.

The control processing portion 25 performs a control process for executing an original function of the tablet PC 4. In other words, the built-in programs 25a are executed in response to an operation command which is input by using the operation input portion 21 or the switches 28, and thus various functions of the tablet PC 4, such as a calculation function, a communication function, and an imaging function are realized.

The coupling processing portion (portable terminal-side) 26 is a terminal-side connection processing portion, and transmits and receives signals to and from the coupling processing portion (facility-side) 14 provided in the facility-side so as to perform a coupling process (terminal-side) in which the facility-operation processing portion 24 is brought into a state (a connection state) of being connected to a production facility (the facilities #1, #2, #3, . . . ) which is designated as an operation input target (refer to FIG. 4).

In this connection state, an operation input to the control processing portion 13 of the production facility from the tablet PC 4 is permitted, and thus the production facility can be operated through a remote operation from the tablet PC 4. On the other hand, an operation input using the facility-side operation input unit in the corresponding production facility is fundamentally prohibited except for some operation items. Accordingly, it is possible to prevent, for example, another worker who does not know about the remote operation being performed from performing an improper operation input which wrongly leads to an unsafe state by accessing the corresponding production facility.

The wireless communication portion 27 is a wireless communication module, and transmits and receives wireless signals to and from the facilities #1, #2, #3, . . . via the wireless station 3 connected to the communication network 2.

In the present embodiment, a plurality of hardware switches 16 are provided at the facilities #1, #2, #3, . . . which are production facilities, and a connection permission input is performed by using the hardware switches 16 so that a predetermined condition for sending a connection permission signal to the coupling processing portion (portable terminal-side) 26 is satisfied.

Next, with reference to a flowchart of FIG. 4 and FIGS. 5 to 10, a description will be made of a coupling process of connecting the tablet PC 4 to the facilities #1, #2, #3, . . . in the component mounting system 1. In this coupling process, a coupling process (terminal-side) A performed in the tablet PC 4 which is carried by the worker and a coupling process (facility-side) B performed in the facilities #1, #2, #3, . . . which are targets of a connection request are performed in parallel through signal transmission and reception using wireless communication.

Figure 5:
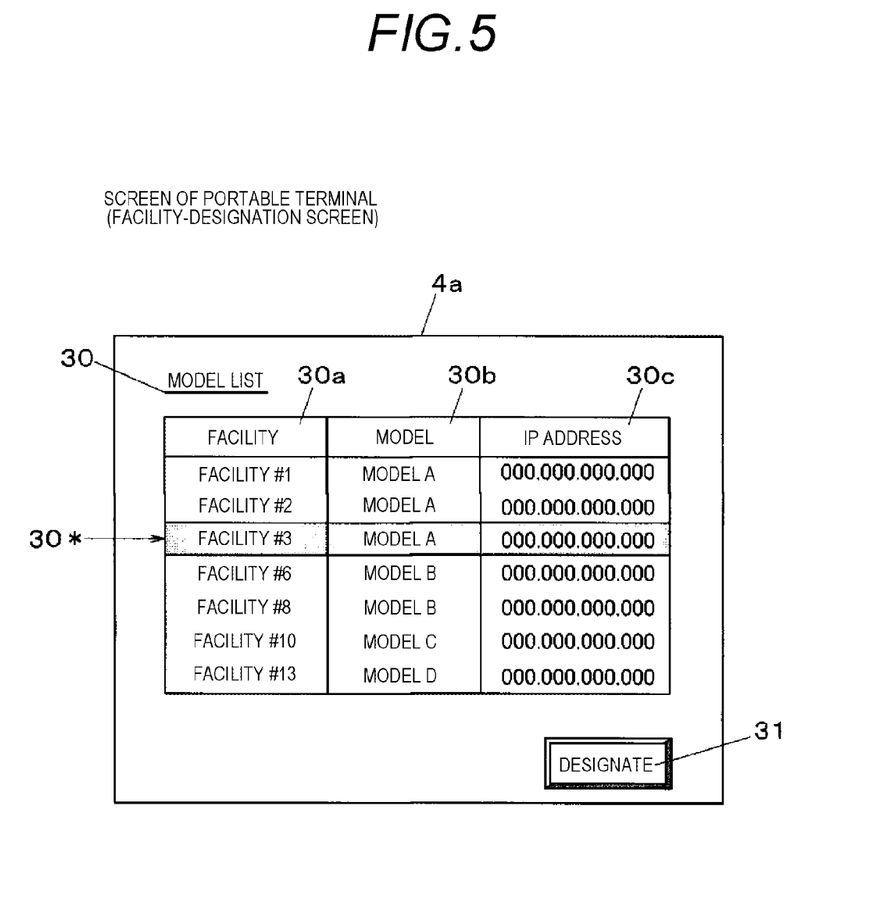
FIG. 5 illustrates a screen displayed on the portable operation terminal when the coupling process is performed in the production system according to the embodiment of the present invention.

When the coupling process starts, first, a facility-designation screen illustrated in FIG. 5 is displayed on the display/operation screen 4a of the tablet PC 4. Accordingly, a model list 30 indicating a list of facilities which can be designated as a connection target in the component mounting system 1 is displayed on the display/operation screen 4a.

A "facility" 30a for specifying a facility with a unique number or the like, a "model" 30b indicating a production target model of a corresponding facility, and an "IP address" 30c used to specify a corresponding facility at the time of communication between the tablet PC 4 and the production facility are prescribed in the model list 30.

Figure 6:
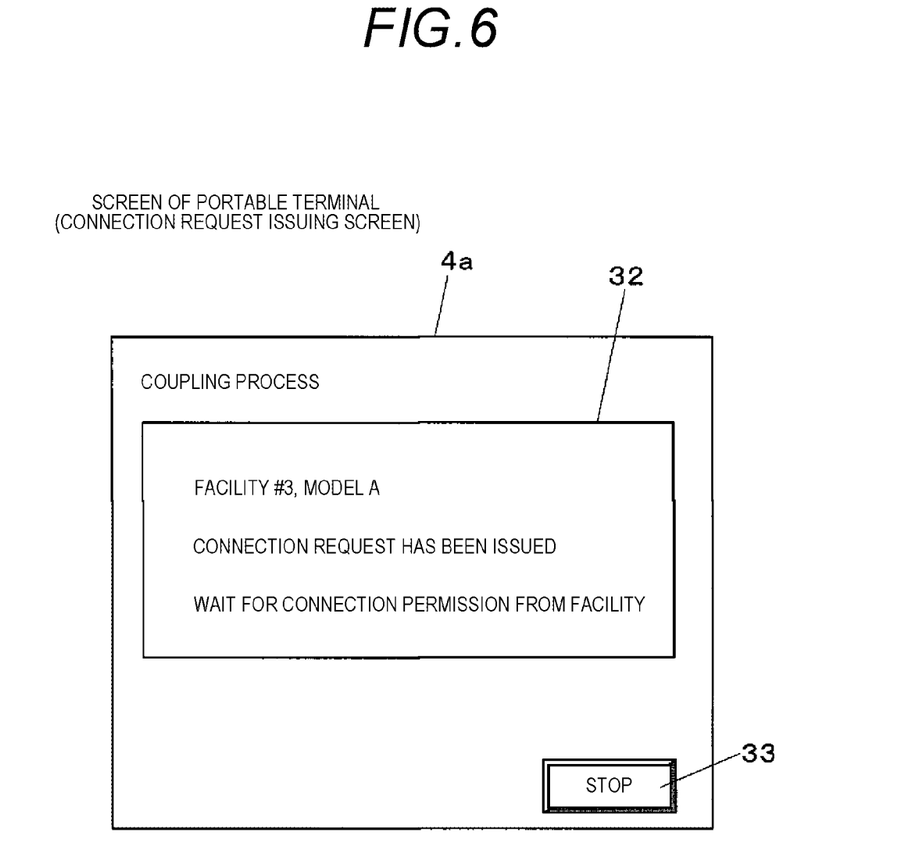
FIG. 6 illustrates a screen displayed on the portable operation terminal when the coupling process is performed in the production system according to the embodiment of the present invention.

When a facility is designated, a designation facility 30* (here, the facility #3) which serves as a connection target is selected from the "facilities" 30a displayed in the model list 30, and the coupling process illustrated in FIG. 4 is started by operating a designation operation button 31. In other words, a connection request is issued to a facility which is designated from the facility-designation screen illustrated in FIG. 5 (ST1A), and a connection request issuing screen is displayed on the display/operation screen 4a as illustrated in FIG. 6.

Here, a message frame 32 indicating that a connection request is issued in relation to a model A of the facility #3 is displayed. In addition, in a case where a connection request is stopped, the coupling process is stopped by operating a stop operation button 33. Further, subsequently to the connection request issuing, the tablet PC 4 is brought into a state of waiting for connection permission (ST2A), and monitors whether or not there is a connection permission or non-permission response from the target facility (ST3A). At this time, the facilities #1, #2, #3, . . . wait for a connection request at all times (ST1B), and are in a state of monitoring whether or not the connection request is received (ST2B). Here, if the connection request issued in (ST1A) is received (arrow a), "presence of the connection request" is confirmed in (ST1B) and (ST2B), and thus an operation instruction screen is displayed on the display panel 6 of the corresponding facility (here, the facility #3) (ST3B).

Figure 8:
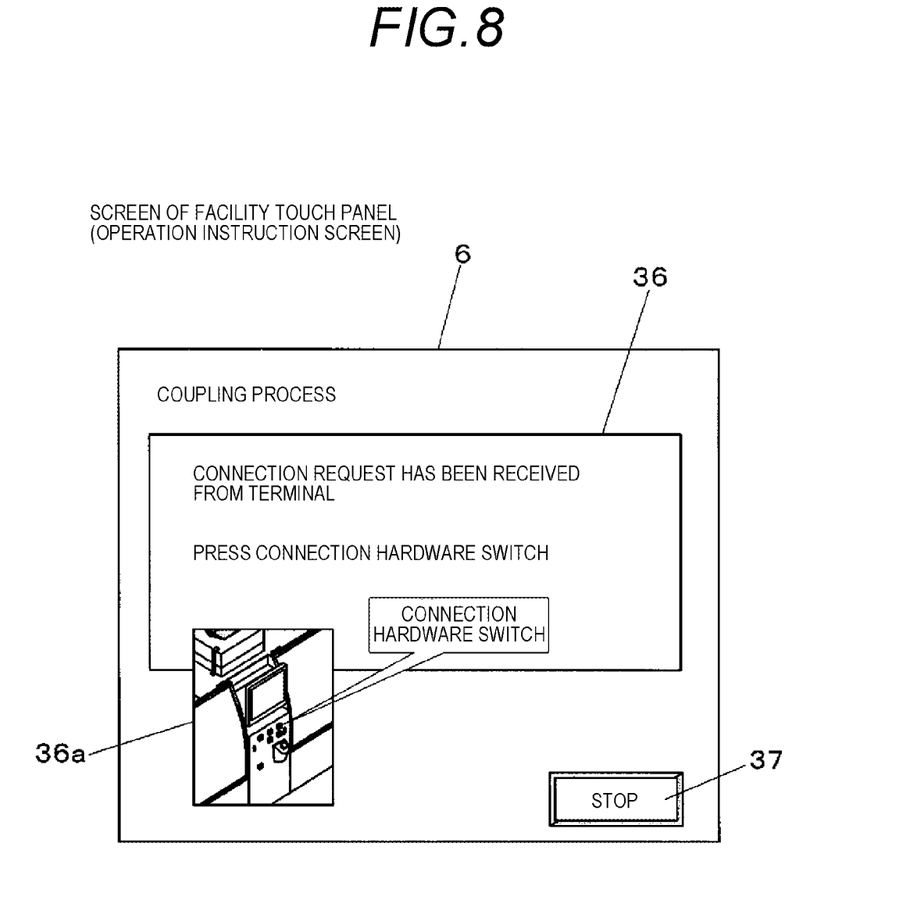
FIG. 8 illustrates a screen displayed on the production facility when the coupling process is performed in the production system according to the embodiment of the present invention.

In other words, as illustrated in FIG. 8, a message frame 36 indicating that the connection request from the tablet PC 4 has been received and the connection hardware switch is prompted to be operated in order to permit the connection request is displayed on the touch panel of the display panel 6 along with a reference image frame 36a, and pressing of the connection SW is monitored in order to monitor whether or not an operation of pressing the connection hardware switch is performed ((ST4B) and (ST5B)). In addition, in a case where the connection request is not permitted and the coupling process is stopped, a stop operation button 37 is operated.

Figure 9:
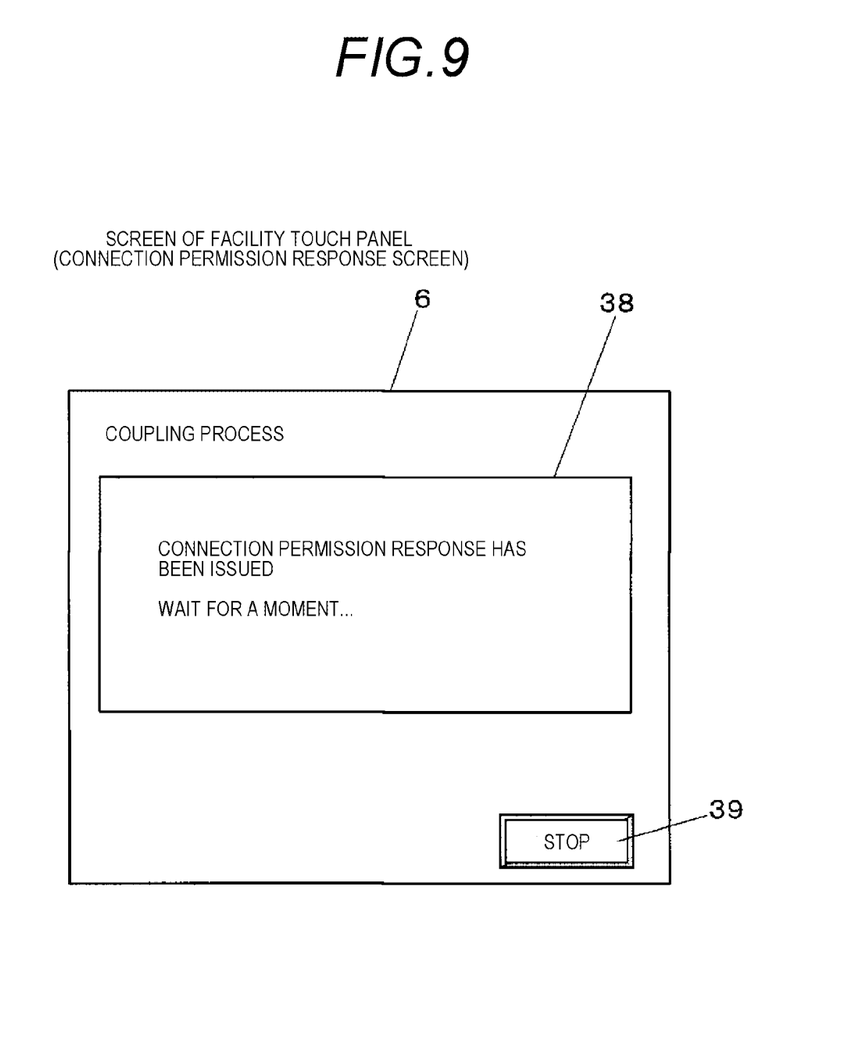
FIG. 9 illustrates a screen displayed on the production facility when the coupling process is performed in the production system according to the embodiment of the present invention.

Here, if a pressing operation of the connection hardware switch is detected in (ST5B), a connection permission or non-permission response (arrow b) is issued to the tablet PC 4 (ST6B). In other words, if the pressing operation is detected, a connection permission response is issued in (ST6B), and thus a connection permission response screen including a message frame 38 indicating that the connection permission response is issued is displayed on the display panel 6 of the corresponding facility as illustrated in FIG. 9. In addition, in a case where the connection permission response is not issued and the process is stopped, a stop operation button 39 is operated.

Figure 7:
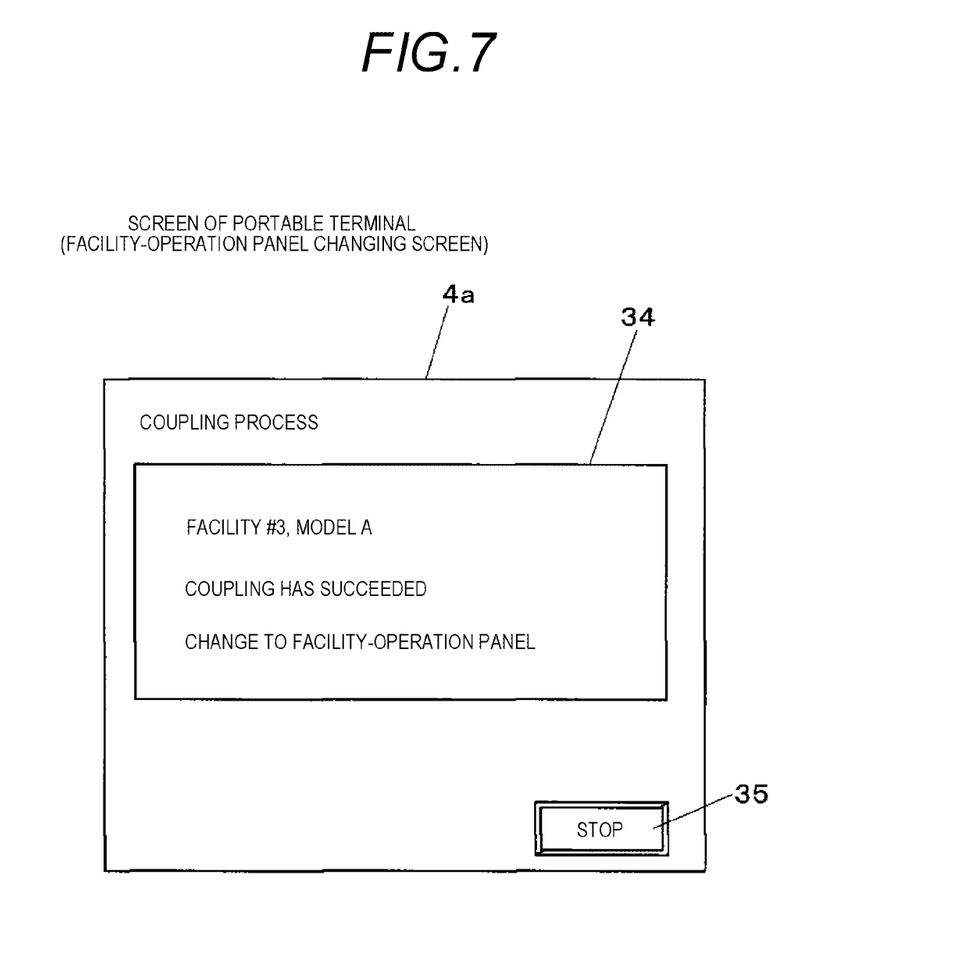
FIG. 7 illustrates a screen displayed on the portable operation terminal when the coupling process is performed in the production system according to the embodiment of the present invention.

Further, in the tablet PC 4, reception of the response is confirmed in (ST3A), and "connection permission" is determined in (ST4A) so that a facility-operation panel changing screen illustrated in FIG. 7 is displayed on the display/operation screen 4a of the tablet PC 4 (ST6A). A message frame 34 informing that the coupling to the target facility (here, the model A of the facility #3) has succeeded and a display screen of the display/operation screen 4a is changed to an operation panel for operating a facility is displayed on the screen. Otherwise, in a case where the coupling process is not continued but stopped, a stop operation button 35 is operated.

If the connection permission response is received as mentioned above, a facility-operation panel displayed on the display panel 6 of the target facility in a normal state is displayed on the display/operation screen 4a of the tablet PC 4, which thus leads to a state in which the worker can perform a remote operation (ST7A) of the target facility via the tablet PC 4.

Figure 10:
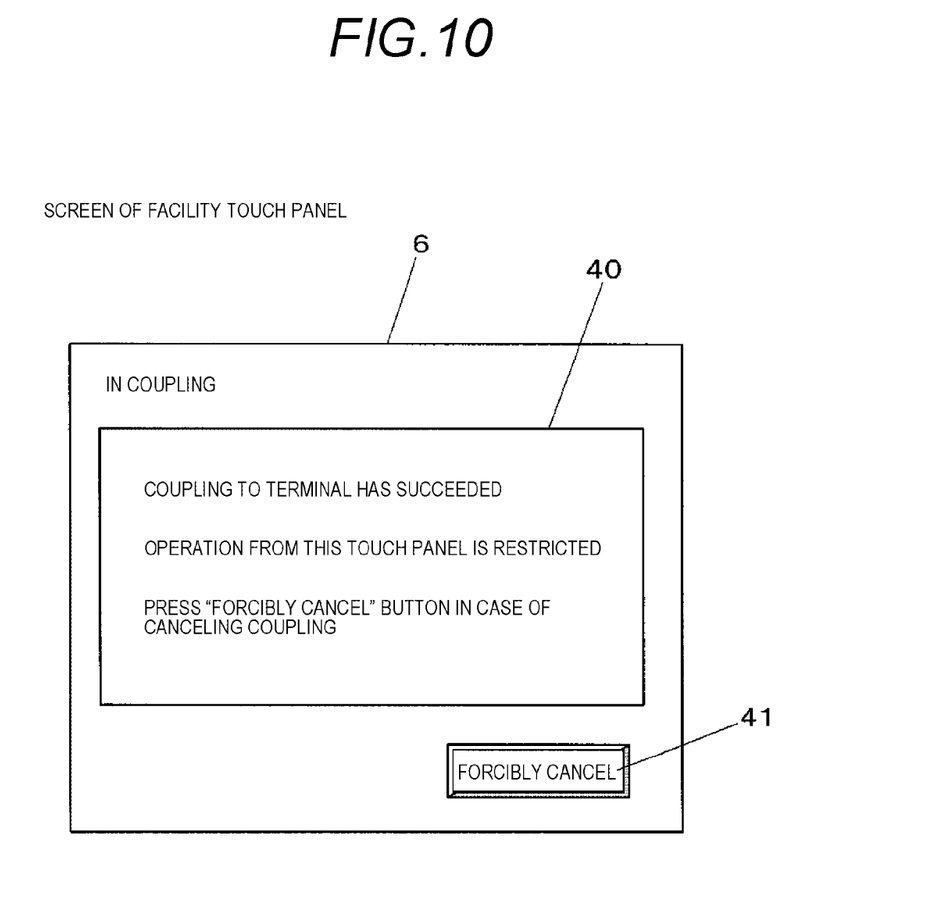
FIG. 10 illustrates a screen displayed on the production facility when the coupling process is performed in the production system according to the embodiment of the present invention.

In addition, if "completion of connection permission response" is confirmed in (ST7B), a function restriction of the operation input portion and a remote operation mode are set (ST8B). Further, as illustrated in FIG. 10, a message frame 40 indicating that the coupling to the tablet PC 4 has succeeded and an operation using the display panel 6 of the corresponding facility is restricted is displayed on the display panel 6 of the corresponding facility. Furthermore, in a case where the coupling is canceled, a forcible cancellation button 41 is operated.

Here, the function restriction of the operation input portion is to restrict an operation using the display panel 6 or the operation panel 5 of the corresponding facility to an operation regarding some functions (emergency stop, cancellation of a connection state, and the like). In addition, the remote operation mode indicates a state in which an operation of the facility can be performed from the tablet PC 4. In the remote operation mode, functions of the facility which can be operated by using the tablet PC 4 are limited to the functions of the facility which are restricted due to the function restriction of the operation input portion. Accordingly, it is possible to eliminate a possibility of an improper operation in which another person performs a different operation input by using the operation portion of the facility even though the worker inputs an operation by using the tablet PC 4, and thus to avoid problems due to the facility performing an operation which is not intended by the worker who is inputting an operation by using the tablet PC 4.

In the above-described coupling state, the facility is operated via the tablet PC 4 in (ST7A). Accordingly, an operation command is sent to the facility which is a coupling target (arrow c), and the corresponding facility is operated in response to an operation from the tablet PC 4 in the remote operation mode (ST9B), and is brought into a state of monitoring whether or not there is a connection cancellation request from the tablet PC 4 (ST10B).

On the other hand, if a pressing operation is not detected in (ST5B) and there is time-out, a connection non-permission response is issued in (ST6B), "completion of connection non-permission response" is confirmed in (ST7B), and the flow returns to the previous state of (ST1B). In addition, in the tablet PC 4, reception of the connection non-permission response is confirmed in (ST3A), "connection non-permission" is determined in (ST4A), connection non-permission is displayed on the display/operation screen 4a of the tablet PC 4 (ST5A), and the coupling process is finished (ST12A).

In the process of an operation of the facility using the tablet PC 4, in a case where the connection between the tablet PC 4 and the production facility is not required to be continued, the worker issues a connection cancellation request to the production facility by using the tablet PC 4 (ST8A) (arrow d). Accordingly, the tablet PC 4 is brought into a state of waiting for a connection cancellation response from the facility-side (ST9A), and monitoring whether or not there is a response signal (ST10A).

In addition, in a case where the connection cancellation request issued in (ST8A) is confirmed in (ST10B), and "presence of the connection cancellation request" is determined, the facility-side issues a connection cancellation response (ST11B) which is sent to the tablet PC 4 in a state of waiting for the connection cancellation response (ST9A) (arrow e). Accordingly, in the facility-side, the function restriction of the operation input portion and the remote operation mode are canceled (ST12B), and then the flow returns to the previous state of (ST1B). Further, in the tablet PC 4, "presence of the response" is determined in (ST10A), the connection between the tablet PC 4 and the facility is canceled (ST11A), and the coupling process is finished (ST12A).

In other words, in the above-described coupling process, the coupling processing portion (portable terminal-side) 26 which is a terminal-side connection processing portion sends a connection request signal (arrow a) for a connection request to the coupling processing portion (facility-side) 14 which is a facility-side connection processing portion, and the coupling processing portion (facility-side) 14 sends a connection permission signal (arrow b) for responding to the connection request signal to the coupling processing portion (portable terminal-side) 26 according to a predetermined condition. Therefore, the tablet PC 4 is connected to a production facility which is a target. Here, when the worker performs a connection permission input by using the hardware switch 16 as described above, the predetermined condition is satisfied.

In addition, in this connection state, an operation input to the control processing portion 13 of the production facility from the tablet PC 4 is permitted so that a remote operation from the tablet PC 4 is performed, and a predetermined range of operation inputs using the operation input portion 11 of the production facility-side are prohibited.

As described above, in the present embodiment, the component mounting system 1, configured to include the facilities #1, #2, #3, . . . which are production facilities and the tablet PC 4 connectable thereto through wireless communication, is provided with the coupling processing portion (facility-side) 14 which brings a connection state between the operation input portion 11 and the operation input processing portion 12 which are a facility-side operation input unit and the tablet PC 4, and the coupling processing portion (portable terminal-side) 26 which brings a connection state between the facility-operation processing portion 24 of the tablet PC 4 and a production facility serving as a target of an operation input target. The coupling processing portion (portable terminal-side) 26 sends a connection request signal for a connection request to the coupling processing portion (facility-side) 14, and the coupling processing portion (facility-side) 14 sends a connection permission signal for responding to the connection request signal to the coupling processing portion (portable terminal-side) 26 according to a predetermined condition, so that the connection state is brought. In this connection state, it is permitted that an operation input to the control processing portion of the production facility from the portable operation terminal. Accordingly, the portable operation terminal is connected to only the production facility which outputs the connection permission signal for responding to the connection request signal according to a predetermined condition, and thus it is possible to prevent the portable operation terminal from being wrongly connected to other production facilities.

In addition, the input portion which performs a connection permission input is provided at a production facility, and thus a facility which is a coupling target can be recognized by a worker, and a prompt for confirming a state of the facility with the eye can be given to the worker. Therefore, it is possible to further increase safety.

Further, a plurality of input portions are provided at a production facility, and thus a coupling process can be performed at a position where work for the production facility is performed. Therefore, it is possible to make safety and workability compatible.

In addition, operations which are permitted to be input to the control processing portion of a production facility from the portable operation terminal are made different depending on positions of the input portions performing a connection permission input, and thus it is possible to make safety and workability compatible to a higher level.

Furthermore, operations using the facility-side operation input unit are restricted to operations regarding some functions in a connection state as compared to a non-connection state, and thus it is possible to avoid problems due to another person operating the facility-side operation input unit and therefore a facility performing an operation which is not intended by a worker who is operating the facility by using the portable operation terminal in the remote operation mode.

In addition, although, in the present embodiment, a description has been made of a case where a production system is the component mounting system 1 which mounts an electronic component on a liquid crystal board, an application target of the present invention is not limited thereto. For example, a production facility, which produces a product and includes a working portion that executes work for production, a control processing portion that executes work by controlling the working portion, and a facility-side operation input unit for performing an operation input on the control processing portion, is employed as a configuration of the present invention.

In addition, although, in the present embodiment, the facilities #1, #2, #3, . . . which are a plurality of production facilities are connected to each other via the communication network 2, and perform wireless communication with the tablet PC 4 via the wireless station 3 provided in the communication network 2, the communication network 2 and the wireless station 3 are not essential constituent elements, and direct wireless communication may be performed between the tablet PC 4 and an individual production facility. Further, a plurality of production facilities may not necessarily be connected to each other, and the present invention is also applicable to a case where wireless communication is performed between a single production facility and the tablet PC 4.

Furthermore, it is preferable that a facility-operation screen displayed on the display/operation screen 4*a* by the facility-operation processing portion 24 be the same as a facility-operation screen displayed on the display panel 6 of a connected production facility, but the facility-operation screens are not necessarily required to be the same as each other in the present invention.

In addition, although a description has been made of an example of using the hardware switch 16 as an input portion which allows a worker to perform a connection permission input indicating permission of the connection request, an operation button displayed on the touch panel of the display panel 6 may be used as the input portion.

In a case where input portions (hardware switches) which allow the worker to perform a connection permission input indicating permission of the connection request are provided at a plurality of locations of a facility, operations which can be operated by using the tablet PC 4 may be different depending on a location where the input portion is provided. For example, in a case where a hardware switch of a material supply portion on a facility rear surface is pressed (ST4B), an operation which can be performed by using the tablet PC 4 is limited to an operation related to the material supply portion, and in a case where a hardware switch around a door used to perform exchange work of consumable members is pressed, an operation which can be performed by using the tablet PC 4 is limited to an operation related to a working portion in which the consumable members are used. Accordingly, a risk of performing a wrong operation by using the tablet PC 4 is reduced.

The production system of the present invention achieves an effect of making safety and workability compatible when a production facility of which a representative is a component mounting facility is operated by a portable operation terminal through wireless communication, and is thus useful in a field of producing a product by using the production facility.

What is claimed is:

1. A component mounting system comprising:
   a plurality of component mounting devices that are used to mount a component to a substrate; and
   a portable operation terminal connectable to each of the plurality of component mounting devices through a wireless communication,
   wherein each component mounting device includes:
   a working portion that executes work for production;
   a control processing portion that controls and causes the working portion to execute the work;
   a facility-side operation input unit for performing an operation input on the control processing portion; and
   a facility-side connection processing portion that brings a connection state between each component mounting device and the portable operation terminal to be in a connection state,
   wherein the portable operation terminal includes:
   a terminal-side operation input unit in which a display portion and an operation portion are united as one unit;
   a facility-operation processing portion that displays a facility-operation screen used to operate each component mounting device on the display portion, and causes the terminal-side operation input unit to function as a unit for performing an operation input on each component mounting device; and
   a terminal-side connection processing portion that brings the connection state between the facility-operation processing portion and each component mounting device which is a target for the operation input,
   wherein the connection state is brought by sending a connection request signal for a connection request to the facility-side connection processing portion from the terminal-side connection processing portion, and sending a connection permission signal for responding to the connection request signal to the terminal-side connection processing portion from the facility-side connection processing portion according to a predetermined condition,
   wherein the operation input to the control processing portion of each component mounting device from the portable operation terminal is permitted in the connection state,
   wherein each component mounting device is provided with a plurality of input portions which allow a worker to perform a connection permission input that indicates permission in response to the connection request, and the predetermined condition is satisfied when the connection permission input is performed,
   wherein the plurality of input portions is provided at different locations on each component mounting device, and
   wherein operations which are permitted to be input to the control processing portion of each component mounting device from the portable operation terminal are made different depending on the location of the input portion on the component mounting device where the connection permission input is performed.

2. The component mounting system according to claim 1, wherein operations using the facility-side operation input unit are restricted to operations regarding some functions in the connection state compared to a non-connection state.

3. The component mounting system according to claim 1, wherein the portable operation terminal includes a facility-designation processing portion that designates a component mounting device selected from among the plurality of component mounting devices as the component mounting device which is the target for the operation input,
   wherein the facility-operation processing portion displays the facility-operation screen for executing production work in the designated component mounting device, on the display portion of the portable operation terminal,
   wherein the terminal-side operation input unit performs an operation input on the facility-designation processing portion and the facility-operation processing portion, and
   wherein the terminal-side connection processing portion brings a connection state between the facility-operation processing portion and the component mounting device designated as a target for the operation input.

4. The component mounting system according to claim 1, wherein the facility-side operation input unit comprises an operation panel provided with operation switches and a display panel provided with touch panel switches.

5. The component mounting system according to claim 4, wherein at least one of the operation switches is an input portion configured to input the predetermined condition for permitting the connection request, and the input portion is a hardware switch.

6. The component mounting system according to claim 5, wherein each hardware switch corresponds to one component mounting device of the plurality of component mounting devices.

7. The component mounting system according to claim 5, wherein the hardware switch is provided at a location which is accessed by the worker for certain work on the component mounting device.

8. The component mounting system according to claim 5, wherein the predetermined condition is a connection permission input performed by a worker using the hardware switch.

9. The component mounting system according to claim 1, wherein the different operations in each component mounting device are limited to operations permitted to be performed on each component mounting device.

10. A component mounting system comprising:
    a plurality of component mounting devices that are used to mount a component to a substrate; and
    a portable operation terminal connectable to each of the plurality of component mounting devices through a wireless communication,
    wherein each component mounting device includes:
    a working portion that executes work for production;

a control processing portion that controls and causes the working portion to execute the work;

a facility-side operation input unit for performing an operation input on the control processing portion; and a facility-side connection processing portion that brings a connection state between each component mounting device and the portable operation terminal to be in a connection state, wherein the portable operation terminal includes:

a terminal-side operation input unit in which a display portion and an operation portion are united as one unit;

a facility-operation processing portion that displays a facility-operation screen used to operate each component mounting device on the display portion, and causes the terminal-side operation input unit to function as a unit for performing an operation input on each component mounting device; and a terminal-side connection processing portion that brings the connection state between the facility-operation processing portion and each component mounting device which is a target for the operation input, wherein the connection state is brought by sending a connection request signal for a connection request to the facility-side connection processing portion from the terminal-side connection processing portion, and sending a connection permission signal for responding to the connection request signal to the terminal-side connection processing portion from the facility-side connection processing portion according to a predetermined condition, wherein the operation input to the control processing portion of each component mounting device from the portable operation terminal is permitted in the connection state, wherein each component mounting device is provided with a plurality of input portions which allow a worker to perform a connection permission input that indicates permission in response to the connection request, and the predetermined condition is satisfied when the connection permission input is performed, wherein the plurality of input portions is provided at different locations on each component mounting device, wherein the facility-side operation input unit comprises an operation panel provided with operation switches and a display panel provided with touch panel switches, wherein at least one of the operation switches is an input portion configured to input the predetermined condition for permitting the connection request, and the input portion is a hardware switch provided at a rear surface of the component mounting device, said rear surface being used for replenishing a component.

* * * * *